United States Patent [19]
Dudley

[11] Patent Number: 6,068,108
[45] Date of Patent: May 30, 2000

[54] CHIP SCREW CONVEYOR WITH FEED ASSIST

[76] Inventor: Russell D. Dudley, 10215 Cricklewood, Portage, Mich. 49024

[21] Appl. No.: 08/942,179

[22] Filed: Oct. 1, 1997

[51] Int. Cl.[7] ................................................. B65G 33/00
[52] U.S. Cl. ................ 198/671; 198/550.01; 198/550.1; 198/550.6; 414/326; 222/240
[58] Field of Search ..................................... 198/671, 670, 198/550.6, 550.2, 550.01, 550.1; 414/326; 222/240, 241, 386, 412, 413; 100/145

[56] References Cited

U.S. PATENT DOCUMENTS

| | | |
|---|---|---|
| 1,427,719 | 8/1922 | Bruck . |
| 1,533,217 | 4/1925 | Steiner . |
| 1,659,254 | 2/1928 | Finger . |
| 1,694,228 | 12/1928 | Müller . |
| 2,003,417 | 6/1935 | Andreas . |
| 2,556,391 | 6/1951 | Hawk . |
| 2,613,799 | 10/1952 | Bawden et al. ........................... 198/671 |
| 2,789,604 | 4/1957 | Lappin et al. . |
| 2,908,425 | 10/1959 | Denson . |
| 3,050,177 | 8/1962 | Reed . |
| 3,067,914 | 11/1962 | Ellaby ..................................... 222/227 |
| 3,134,478 | 5/1964 | Haen et al. . |
| 3,155,288 | 11/1964 | Landgraf ................................. 222/413 |
| 3,240,400 | 3/1966 | Smith . |
| 3,256,862 | 6/1966 | Patterson . |
| 3,363,806 | 1/1968 | Blakeslee et al. . |
| 3,411,675 | 11/1968 | Wahl . |
| 3,735,904 | 5/1973 | Vissers . |
| 3,841,908 | 10/1974 | Giersing .................................. 198/670 |
| 4,095,705 | 6/1978 | Hood . |
| 4,227,656 | 10/1980 | Engebretsen . |
| 4,234,074 | 11/1980 | Martin . |
| 4,261,520 | 4/1981 | Hetrick .................................... 222/412 |
| 4,381,082 | 4/1983 | Elliott et al. . |
| 4,422,750 | 12/1983 | Kawata . |
| 4,424,891 | 1/1984 | Dudley et al. . |
| 4,431,105 | 2/1984 | Meeker et al. .......................... 198/671 |
| 4,781,823 | 11/1988 | Shinozaki ................................ 100/117 |
| 4,821,968 | 4/1989 | Fleche . |
| 4,923,358 | 5/1990 | Van Mill ............................... 198/550.1 |
| 4,951,883 | 8/1990 | Loppoli et al. . |
| 5,143,310 | 9/1992 | Neier . |
| 5,366,067 | 11/1994 | Courtois et al. ........................ 414/326 |
| 5,449,263 | 9/1995 | Campbell et al. ....................... 414/326 |
| 5,639,202 | 6/1997 | Roycraft ................................. 198/671 |

FOREIGN PATENT DOCUMENTS

| | | |
|---|---|---|
| 108390 | 8/1943 | Germany . |
| 11259 | 1/1988 | Japan . |

*Primary Examiner*—Christopher P. Ellis
*Assistant Examiner*—Khoi H. Tran
*Attorney, Agent, or Firm*—Price Heneveld Cooper Dewitt & Litton

[57] ABSTRACT

A screw conveyer for conveying metal turnings from a machining operation. The chip screw conveyor includes an auger-like screw configured to move metal turnings in a given direction. The conveyor includes a tubular housing and an input chute defining an input opening. A secondary feeder arm is pivoted to the conveyor housing. The arm is pivoted out of the way in direction when agglomerated scraps/chips are dumped threw input opening into the input chute. Once the chips are dumped in place, the arm is allowed to rotate downwardly to press on the top of the agglomerated scraps/chips. This prevents the chips from "bridging" between the sides of the input chute and prevents the scraps from "balling" or rolling on top of the screw in a manner that makes the screw ineffective. The arm creates sufficient force to press the scrap into engagement with the flutes of the screw. In an alternative embodiment, an arm includes a small secondary screw mounted to the arm for moving agglomerated scraps/chips along the arm and into engagement with the underlying screw. In yet another embodiment, an arm includes a vibrator for vibrating the arm to make it more effective.

14 Claims, 2 Drawing Sheets

CHIP SCREW CONVEYOR WITH FEED ASSIST

BACKGROUND OF THE INVENTION

The present invention concerns screw conveyors particularly adapted for handling agglomerated metal turnings and scrap from machining operations, and more particularly concerns a feed assist for use with a chip screw conveyor.

Agglomerated metal scrap from machining and lathe operations is difficult to handle since the metal scrap material is intertwined and twisted, and is very abrasive. Problems arise when trying to convey this agglomerated metal scrap since it bunches up and bridges across side portions of a conveyor chute, preventing the conveyor screw from engaging the scrap material and thus making the screw ineffective. The metal scrap material will also form "tumbleweed" like masses that roll along a top of the conveyor screw against the operating direction of the conveyor screw. Accordingly, a feed assist is required that is relatively simple, and that will function in the environment of agglomerated metal scrap without itself causing a conveyor plugging problem. Further, it is preferable that any feed assist be compatible with existing equipment so that it is retrofitable.

Accordingly, an improved apparatus and method solving the aforementioned problems is desired.

SUMMARY OF THE INVENTION

In one aspect, the present invention includes a screw conveyor apparatus including a screw conveyor. The screw conveyor includes a housing that defines an inlet chute and a screw rotatable in the housing with an end proximate the inlet chute. Further, the screw conveyor includes a feed assist operably mounted to the housing at the inlet. The feed assist is movable between a first position allowing addition of agglomerated metal scrap into the inlet chute and movable to a second position for pressing the agglomerated metal scrap material in the inlet against the outer surface of the screw.

In another aspect, the present invention includes a method including steps of providing a screw conveyor with a feed assist positioned at an inlet end of the screw conveyor. The method also includes moving the feed assist to a first position permitting agglomerated scrap to be added to the inlet, adding agglomerated metal scrap to the inlet, moving the feed assist to a second position for pressing the agglomerated metal scrap onto the screw in the screw conveyor, and pressing the agglomerated metal scrap into engagement with the screw of the screw conveyor to assist in moving the agglomerated metal scrap while rotating the screw.

These and other features, advantages and objects of the present invention will be further understood and appreciated by those skilled in the art by reference to the following specification, claims and appended drawings.

DETAILED DESCRIPTION OF PREFERRED EMBODIMENT

Figure 1:
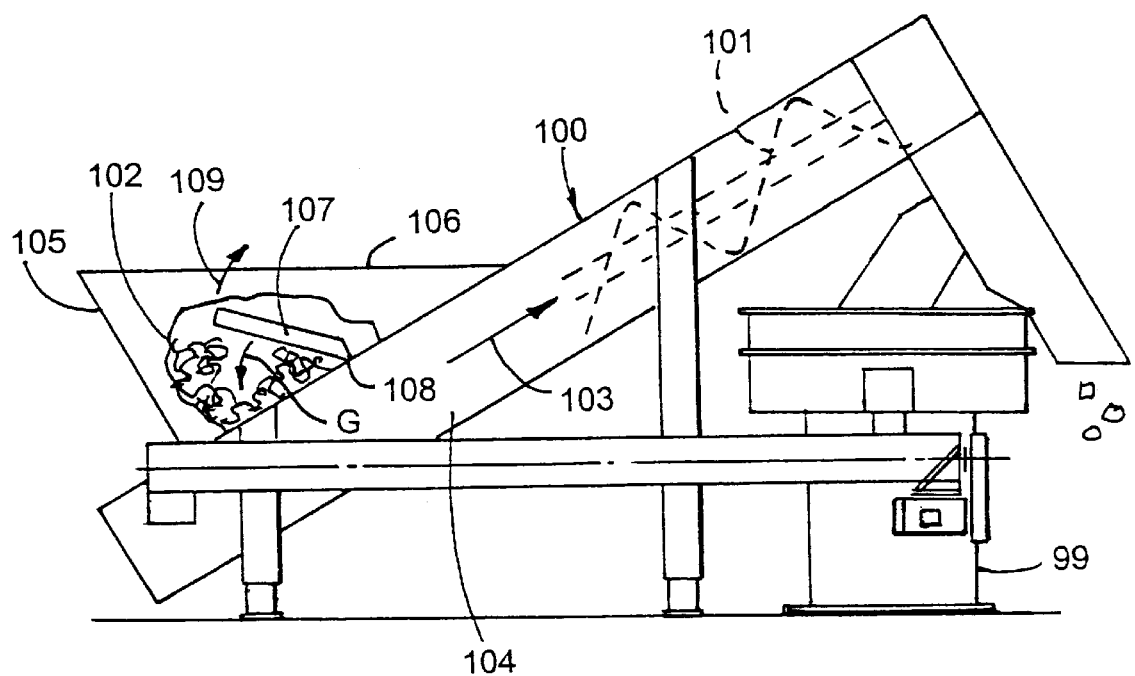
FIG. 1 is a side view, partially broken away, of an apparatus embodying the present invention.
Figure 2:
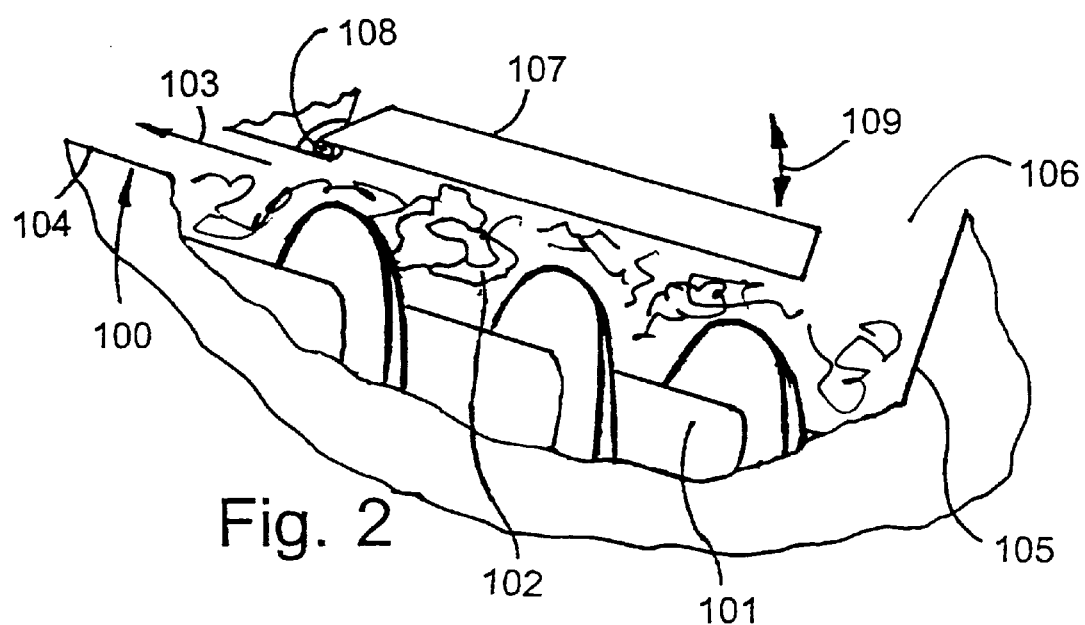
FIG. 2 is an enlarged fragmentary view of a longitudinal cross section of the chute area of the screw conveyer shown in FIG. 1.

A screw conveyer system 100 (FIG. 1) embodying the present invention is provided that is particularly adapted for conveying agglomerated metal scrap 102 comprising turnings, strings of metal, chips, chunks of metal, and the like from machining and lathe operations to a chip-and-lubricant separator 99. The chip screw conveyor 100 includes an auger-like screw 101 configured to move metal turnings and agglomerated metal scrap 102 in a direction 103. The screw 101 is positioned in a tubular housing 104, which housing 104 includes an input chute 105 with angled side walls defining an input opening 106. A secondary feed assist arm 107 (FIG. 2) is pivoted at location 108 to the conveyor housing 104. Arm 107 is weighted to provide a gravitational force sufficiently heavy to press the scrap 102 against screw 101, but not so heavy as to prevent easy lifting to allow new scrap material to be dumped into the chute. It is noted that the particular weight of the arm 107 is dependent upon the properties of the metal scrap 102 and the size of the arm 107, but testing has shown that the weight need not be particularly high. Alternatively, the arm could be forced down so as not to rely on gravity. To load chute 105, arm 107 is pivoted out of the way in direction 109 so that agglomerated scrap 102 can be dumped through input opening 106 into the input chute 105. Once the scrap 102 is dumped in place, the arm 107 pivoted into housing 104 about hinge 108. Thereafter, the arm 107 is allowed to rotate downwardly by the force of gravity along direction 109 to press against a top of the agglomerated scraps 102 in chute 105. This prevents the scraps 102 from "bridging" between the sides of the input chute 105 in a manner that makes the screw 101 ineffective, and further prevents the scrap 102 from "balling" or rolling along a top of the screw 101 in a manner also making the screw ineffective. The arm 107 presses the agglomerated scrap 102 into engagement with the flutes of the auger screw 101. The feed assist arm 107 rotates downwardly until all scrap 102 is conveyed away by screw 101. At such time, feed assist 107 is designed to rest on screw 102 or alternatively is constructed to rest on a stop on chute 105. It is contemplated that the arm 107 can be attached to a pivotable lid (not specifically shown) that covers the chute 105 so that the arm 107 is automatically pivoted out of the way whenever a worker is dumping new agglomerated scrap into the chute 105. Alternatively, the arm 107 can be made removable or retractable from the chute 105.

Figure 3:
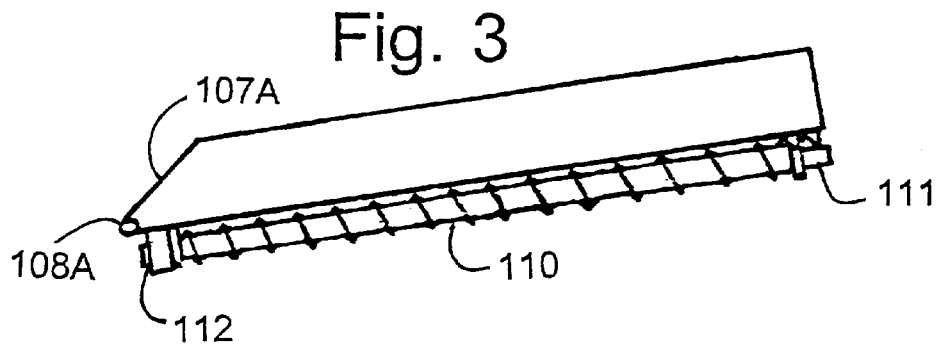
FIG. 3 is a side view of a modified feed assist similar to FIG. 2 but including an arm with a secondary feeder screw thereon.
Figure 4:
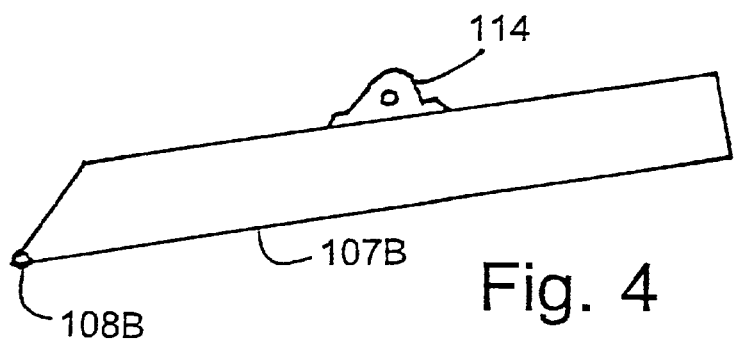
FIG. 4 is another modified feed assist similar to FIG. 2 but including an arm with a vibrator thereon.

In an alternative embodiment, an arm 107A (FIG. 3) is mounted at pivot 108A and includes a small secondary screw 110 operably mounted to the arm 107A by bearing 111 and bearing/drive 112. The secondary screw 110 is configured to rotate and thus move agglomerated scraps/chips 102 along the arm and into engagement with the underlying screw 101. The secondary screw can operate in either direction and at any speed, but preferably operates in the same direction as the conveyor screw and at a lower speed to prevent bunching and binding of the scrap 102 at the hinge 108 on the secondary screw 110. In yet another embodiment of FIG. 4, an arm 107B includes a vibrator 114 for vibrating the arm 107B to make it more effective.

Notably, conveyor screw bearing arrangements and also vibrators are known in the metalworking and conveying industry, and accordingly it is not necessary that these components be described in detail herein for a skilled artisan to understand the present invention. It is contemplated that a variety of means can be provided on the feed assist arm to make the arm more effective, such as plungers, belts, and the like, and the present invention is contemplated to cover such arrangements. Further, different motions of arm movement can be provided to increase the effectiveness of the arm.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A screw conveyor apparatus for conveying agglomerated metal scrap that has a tendency to bridge and ball up in a manner reducing effectiveness of the screw conveyor apparatus, comprising:
    a screw conveyor including a housing defining an inlet chute with angled sides and a screw rotatable in the housing, the screw including an inlet end proximate the inlet chute, the housing and the screw being constructed from heavy-duty materials and designed to engage and convey highly-abrasive agglomerated metal scrap; and
    a feed assist operably mounted to the housing at the inlet chute, the feed assist being movable between a first position allowing addition of agglomerated metal scrap into the inlet end and movable to a second position for pressing the agglomerated metal scrap in the inlet end against an outer surface of the screw.

2. The apparatus defined in claim 1 wherein the feed assist includes an arm pivoted to the housing.

3. The apparatus defined in claim 2 wherein the arm is gravity actuated.

4. The apparatus defined in claim 3 wherein the arm is weighted.

5. The apparatus defined in claim 2 wherein the arm includes a first end hinged to the housing and an opposite end that is free to move up and down, with the opposite end being located closer to the inlet end than the first end.

6. The apparatus defined in claim 5 wherein the screw conveyor is configured to operate at an upwardly extending angle from the inlet chute.

7. The apparatus defined in claim 2 wherein the arm includes a vibrator.

8. A screw conveyor apparatus comprising:
    a screw conveyor including a housing defining an inlet chute with angled sides and a screw rotatable in the housing, the screw including an inlet end proximate the inlet chute; and
    a feed assist operably mounted to the housing at the inlet chute, the feed assist being movable between a first position allowing addition of agglomerated metal scrap onto the inlet end and movable to a second position for pressing the agglomerated metal scrap material in the inlet end against an outer surface of the screw, the feed assist including an arm pivoted to the housing, the arm including a secondary screw positioned adjacent the conveyor screw when the arm is in a downward/operating position.

9. The apparatus defined in claim 8 wherein the secondary screw includes a drive for rotating the secondary screw in a direction the same as the conveyor screw.

10. A method comprising steps of:
    providing a screw conveyor having a primary screw with a feed assist positioned at an inlet end of the screw conveyor, the screw conveyor being constructed from heavy-duty materials adapted to engage and convey highly abrasive agglomerated metal scrap;
    moving the feed assist to a first position permitting agglomerated metal scrap to be added to the inlet end;
    adding agglomerated metal scrap to the inlet end;
    moving the feed assist to a second position for pressing the agglomerated metal scrap onto the primary screw in the screw conveyor; and
    pressing the agglomerated metal scrap into engagement with the screw of the screw conveyor to assist in moving the agglomerated metal scrap while rotating the primary screw.

11. The method defined in claim 10 wherein the feed assist includes an arm pivoted to the screw conveyor, and wherein the step of moving includes pivoting the arm.

12. The method defined in claim 11 including vibrating the arm to improve effectiveness of the feed assist.

13. A method comprising steps of:
    providing a screw conveyor having a primary screw with a feed assist positioned at an inlet end of the screw conveyor, the feed assist including an arm pivoted to the screw conveyor and a secondary screw on the arm;
    moving the feed assist to a first position permitting agglomerated scrap to be added to the inlet end;
    adding highly-abrasive agglomerated metal scrap to the inlet end;
    pivotally moving the feed assist to a second position for pressing the agglomerated metal scrap onto the primary screw in the screw conveyor; and
    pressing the agglomerated metal scrap into engagement with the screw of the screw conveyor to assist in moving the agglomerated metal scrap while rotating the primary screw, including rotating the secondary screw to further assist in moving the agglomerated scrap into engagement with the primary screw.

14. The method defined in claim 11 wherein the arm is weighted and wherein the step of moving includes utilizing gravity to cause the arm to move.

* * * * *